May 20, 1924.                    1,494,838
W. C. HEDGCOCK
SAFETY MEANS FOR BRAKE BEAMS
Filed Jan. 23, 1922
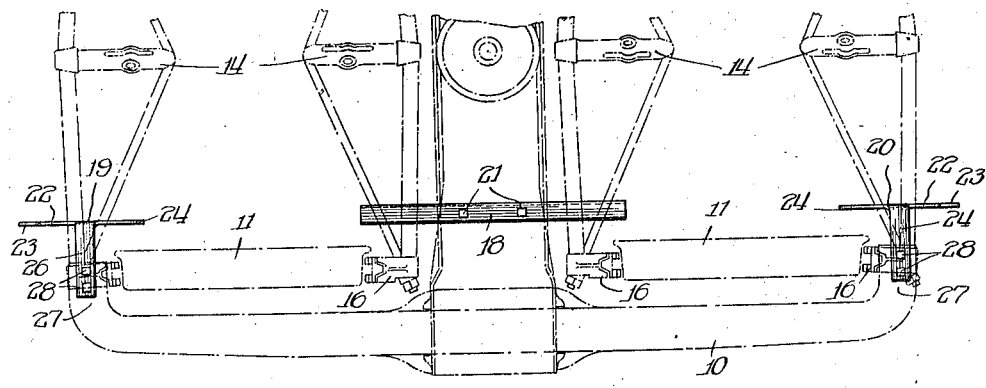
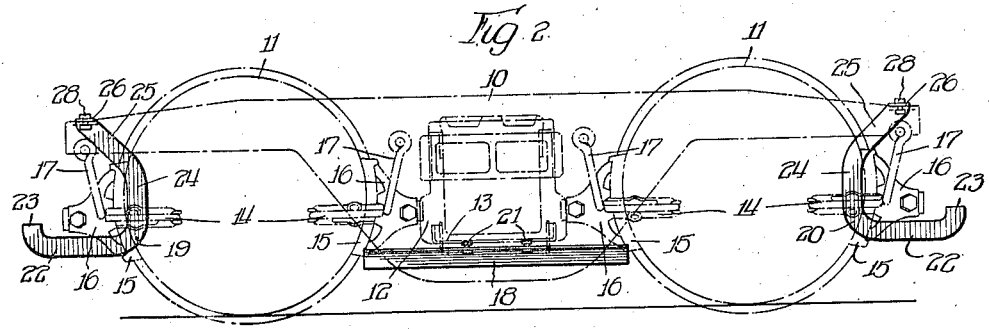
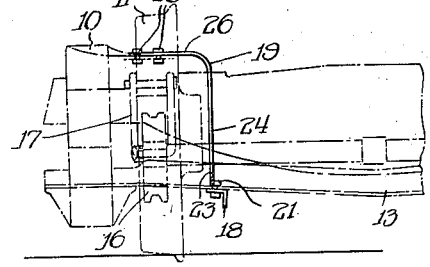
Witness:
R. Burkhardt
Inventor:
William C. Hedgcock,
By Wilkinson, Huxley, Byron & Knight
Attys.

Patented May 20, 1924.

1,494,838

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

SAFETY MEANS FOR BRAKE BEAMS.

Application filed January 23, 1922. Serial No. 531,111.

*To all whom it may concern:*

Be it known that I, WILLIAM C. HEDGCOCK, a citizen of the United States, residing at Chicago, in the county of Cook and State of Illinois, have invented certain new and useful Improvements in Safety Means for Brake Beams, of which the following is a specification.

This invention relates to safety means for brake beams.

One object of the invention is to provide simple, efficient and improved safety means for preventing brake beams from falling to the track in case of failure of some portion of the brake beam or its usual supporting means.

Another object is to provide a simple brake beam safety support designed particularly for use where two brake beams are required per pair of wheels, as in the clasp brake arrangement, and where there is no end rail or tie across the ends of the side frame from which safety supports may be suspended.

A further object is to provide a brake beam safety support which may be easily mounted and dismounted to save time in case it is necessary to take down a brake beam or remove a pair of wheels.

These and other objects are accomplished by means of the arrangement disclosed on the accompanying sheet of drawings, in which—

Figure 1 is a fragmentary top plan view of a railway car truck embodying my invention;

Figure 2 is a fragmentary side elevation of the same arrangement; and

Figure 3 is a fragmentary end elevation of the same railway car truck embodying the invention.

The various novel features of the invention will be apparent from the following description and drawings, and will be particularly pointed out in the appended claims.

Referring to the figures of the drawings, it will be noted that the invention is illustrated in connection with a railway car truck including a side frame 10 carried by truck wheels 11, said side frame having a bolster opening 12 in the bottom portion of which is mounted a spring plank 13 which extends transversely of the truck from side frame to side frame. The drawings disclose the clasp type of brake mechanism in which the brake beams 14 are arranged on opposite sides of a single pair of wheels, said beams being moved toward each other during a braking action, the brake shoes 15 carried by the brake heads 16 at the ends of the brake beams clasping the associated truck wheels 11. The brake beams are suspended and normally held by hangers 17 which, in this particular instance, are suspended from the side frame 10 and connected directly to the brake heads 16. However, it will be understood that so far as this invention is concerned, the brake beams may be supported normally in any suitable manner.

This invention has to do primarily with means for preventing brake beams from falling to the track in the event that such brake beams become detached from their normal supports or hangings. In this connection, I have provided means which takes the form of a plurality of safety bars 18, 19 and 20. The safety bar 18 is in the form of an angle bar and is secured to the underside of the spring plank 13 by any suitable means, such as bolts 21. This safety bar as shown is straight throughout its length and extends longitudinally of the car truck and underlies the inner brake beams 14 adjacent the spring plank 13 and coöperating with adjacent pairs of truck wheels 11. It is apparent that if either or both of the inner brake beams should become detached from their normal hangings the safety bar 18 underlying said brake beams will catch and arrest the said brake beams and prevent same from falling to the track.

In this particular instance a four wheel truck has been shown and separate brake beam safety means has been provided for each of the outer brake beams 14 referred to hereinabove as safety bars 19 and 20. Each of these safety bars or brackets 19 and 20 includes a longitudinally extending portion 22 which underlies its associated outer brake beam 14 and is located to catch its associated brake beam if the latter becomes detached from its normal hangings and prevent same from falling to the track. The outer ends of the longitudinally extending portions 22 of each of said safety bars terminates in a bent-up retaining portion 23. Extending upwardly from the inner ends of each of the longitudinally extending portions 22 is a vertically arranged portion 24 which terminates in an angled portion 25 extending upwardly and longitudinally outwardly. This portion in each case terminates in a laterally extending portion 26 which is projected outwardly over the top of the side frame 10 at the inturned ends 27 thereof, to which the former is secured by any suitable means, such as bolts 28. The safety bars 19 and 20 which are suspended from the ends of the side frame extend around and under the end brake beams for preventing the same from accidentally falling to the track. All of the safety bars 18, 19 and 20 are in alignment with respect to each other and located at the inner side of the truck wheels, it being understood that the safety bars are the same on each side of the truck. The outer safety brackets or bars 19 and 20 are preferably in the form of rectangular bars having their greatest depth arranged vertically to afford the maximum resistance against a downward vertical thrust. All of said safety bars are quickly secured to and removed from their supports for facilitating repair of brake beams and the removal and replacement of truck wheels.

It is my intention to cover all modifications of the invention falling within the spirit and scope of the following claims.

I claim:

1. In clasp brake mechanism for a railway car truck, the combination of a plurality of pairs of truck wheels, brake beams on each side of each pair of wheels, means for normally supporting said brake beams, a safety bar underlying the inner brake beams of adjacent pairs of wheels, and other brake beam safety means underlying other brake beams.

2. In clasp brake mechanism for a railway car truck, the combination of a plurality of truck wheels, brake beams on each side of each pair of wheels, means for normally supporting said brake beams, safety means underlying the inner brake beams of adjacent pairs of wheels, and other brake beam safety means underlying other brake beams.

3. In clasp brake mechanism for a railway car truck, the combination of a plurality of pairs of truck wheels, brake beams on each side of each pair of wheels, means for normally supporting said brake beams, a safety bar underlying the inner brake beams of adjacent pairs of wheels, and a plurality of other safety bars underlying other brake beams.

4. In clasp brake mechanism for a railway car truck, the combination of a side frame, a spring plank supported thereby, a plurality of pairs of truck wheels, brake beams on each side of each pair of wheels, means for normally supporting said brake beams, a safety bar secured to said spring plank and underlying the inner brake beams of adjacent pairs of wheels, and other safety bars secured to said side frame and underlying other brake beams.

Signed at Chicago, Illinois, this 9th day of January, 1922.

WILLIAM C. HEDGCOCK.